United States Patent [19]
Hasegawa

[11] Patent Number: 5,467,079
[45] Date of Patent: Nov. 14, 1995

[54] INCOMING MESSAGE PROCESSING METHOD IN PLURALITY OF TERMINAL EQUIPMENTS AND TERMINAL EQUIPMENT EXECUTING SAID METHOD

[75] Inventor: Kenichi Hasegawa, Inagi, Japan

[73] Assignee: Fujitsu Limited, Kanagawa, Japan

[21] Appl. No.: 405,402

[22] Filed: Mar. 15, 1995

Related U.S. Application Data

[63] Continuation of Ser. No. 96,856, Jul. 26, 1993, abandoned, which is a continuation of Ser. No. 667,659, Mar. 11, 1991, abandoned.

[30] Foreign Application Priority Data

Mar. 16, 1990 [JP] Japan ................................. 2-066207
Sep. 19, 1990 [JP] Japan ................................. 2-249380

[51] Int. Cl.$^6$ ................................................. H04Q 1/00
[52] U.S. Cl. .................. 340/825.16; 370/13; 340/825.5; 395/182.02
[58] Field of Search ..................... 340/825.06, 825.07, 340/825.16, 825.5, 825.51; 364/200 MS File; 370/13, 85.2; 371/7, 8.1, 9.1

[56] References Cited

U.S. PATENT DOCUMENTS

| | | | |
|---|---|---|---|
| 4,160,238 | 7/1979 | Weckenmann et al. | 340/825.07 |
| 4,500,953 | 2/1985 | Takezoe et al. | 364/200 |
| 4,516,122 | 5/1985 | Tomikawa | 340/825.5 |
| 4,561,092 | 12/1985 | Shaver | 340/825.5 |
| 5,282,127 | 1/1994 | Mii | 340/825.16 |

FOREIGN PATENT DOCUMENTS 0245025  11/1987  European Pat. Off. .
59-89065  5/1984  Japan .

OTHER PUBLICATIONS

Patent Abstracts of Japan, vol. 12, No. 287 (E–643)(3134) Aug. 5, 1988 & JP–A–63–063238 (Mar. 19, 1988).

Primary Examiner—Brian Zimmerman
Attorney, Agent, or Firm—Staas & Halsey

[57]  ABSTRACT

In a plurality of terminal equipments connected to one line, in each of the terminal equipments a delay time by which a response from the terminal equipment when in an abnormal state is delayed, is preset. When a message arrives at the plurality of terminal equipments through the one line, an abnormal terminal equipment returns a response delayed by the above-mentioned delay time, and a network transmits a response acknowledgement to only one terminal equipment which returns the earliest response. Only the terminal equipment receiving the response acknowledgement can communicate with other terminal equipment connected to another line through the network. By using the above-constituted invention, when the plurality of terminal equipments are connected to the one line, the response from an abnormal terminal equipment is delayed and a normal terminal equipment can receive the message.

5 Claims, 14 Drawing Sheets

Fig. 1A
PRIOR ART
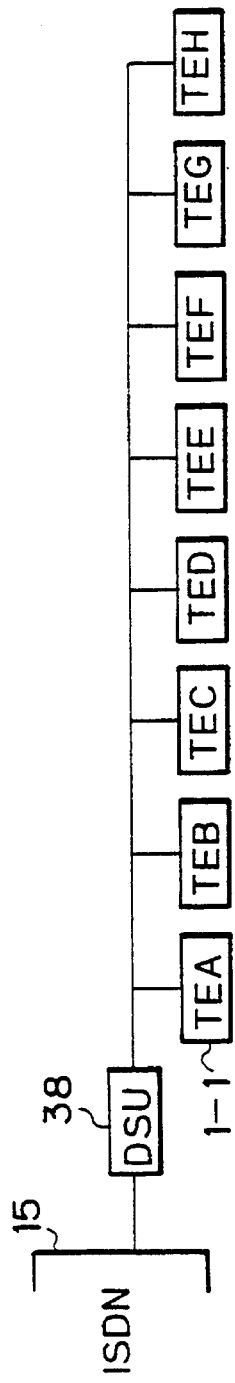
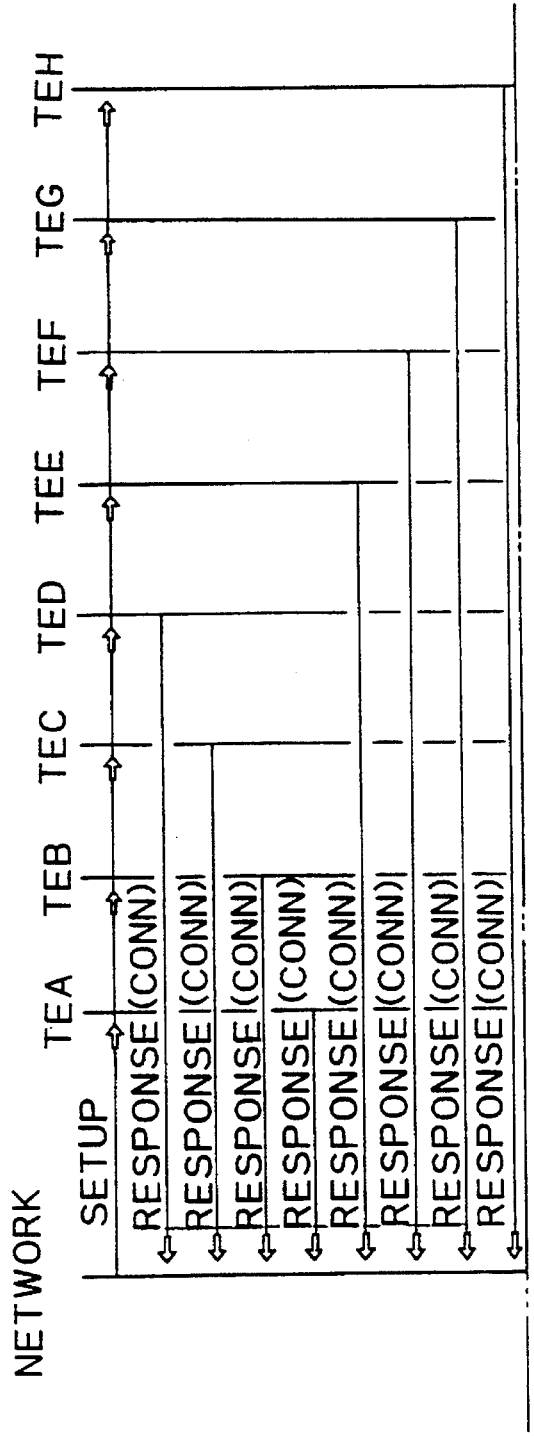

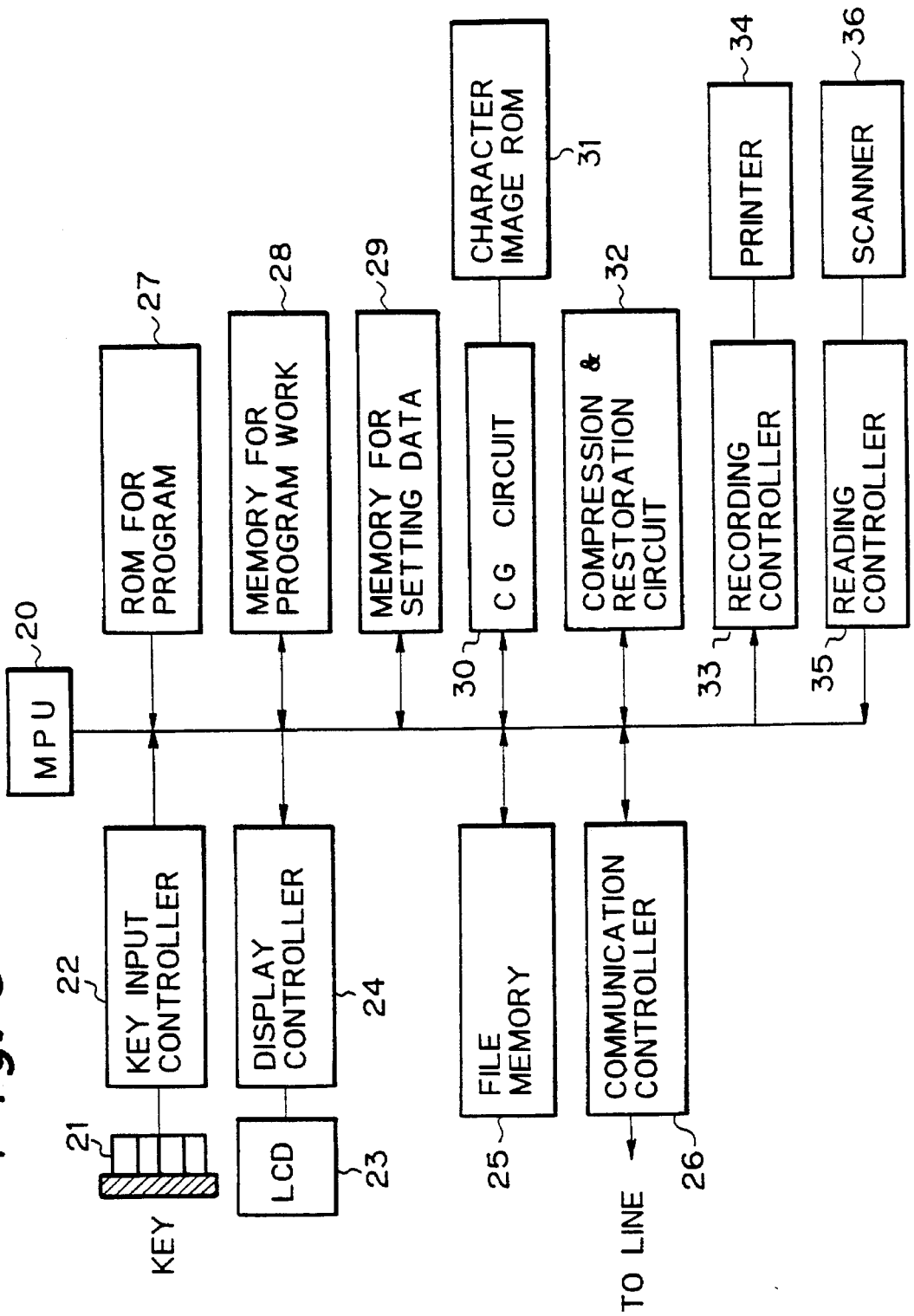

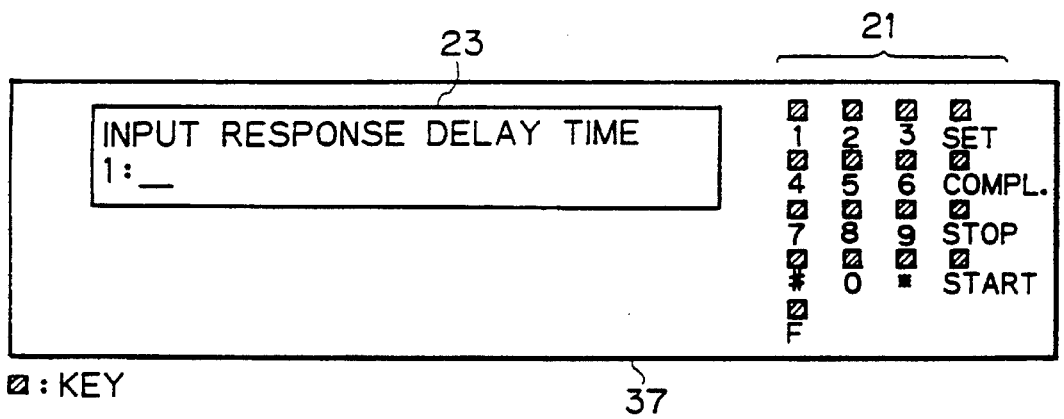

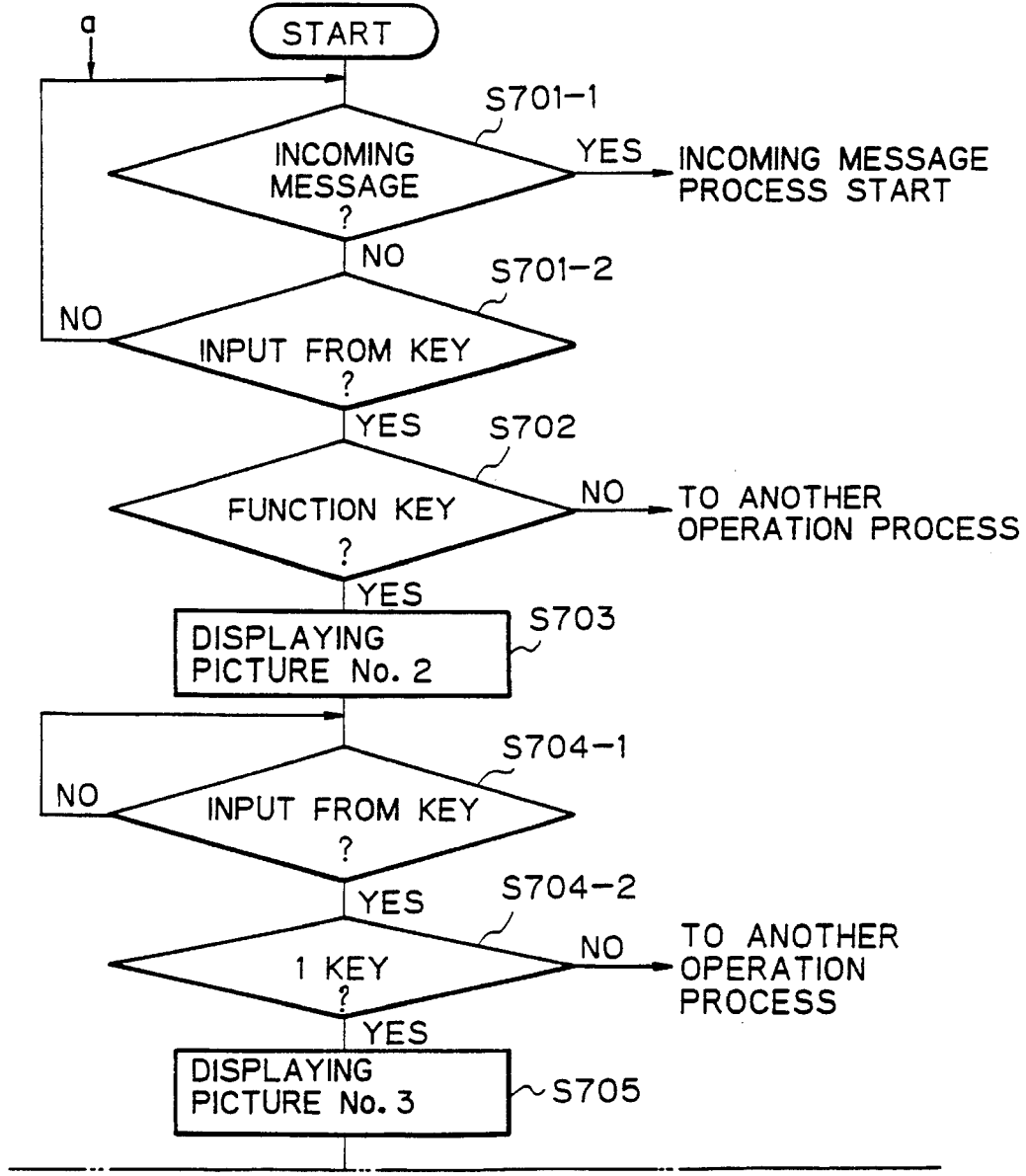

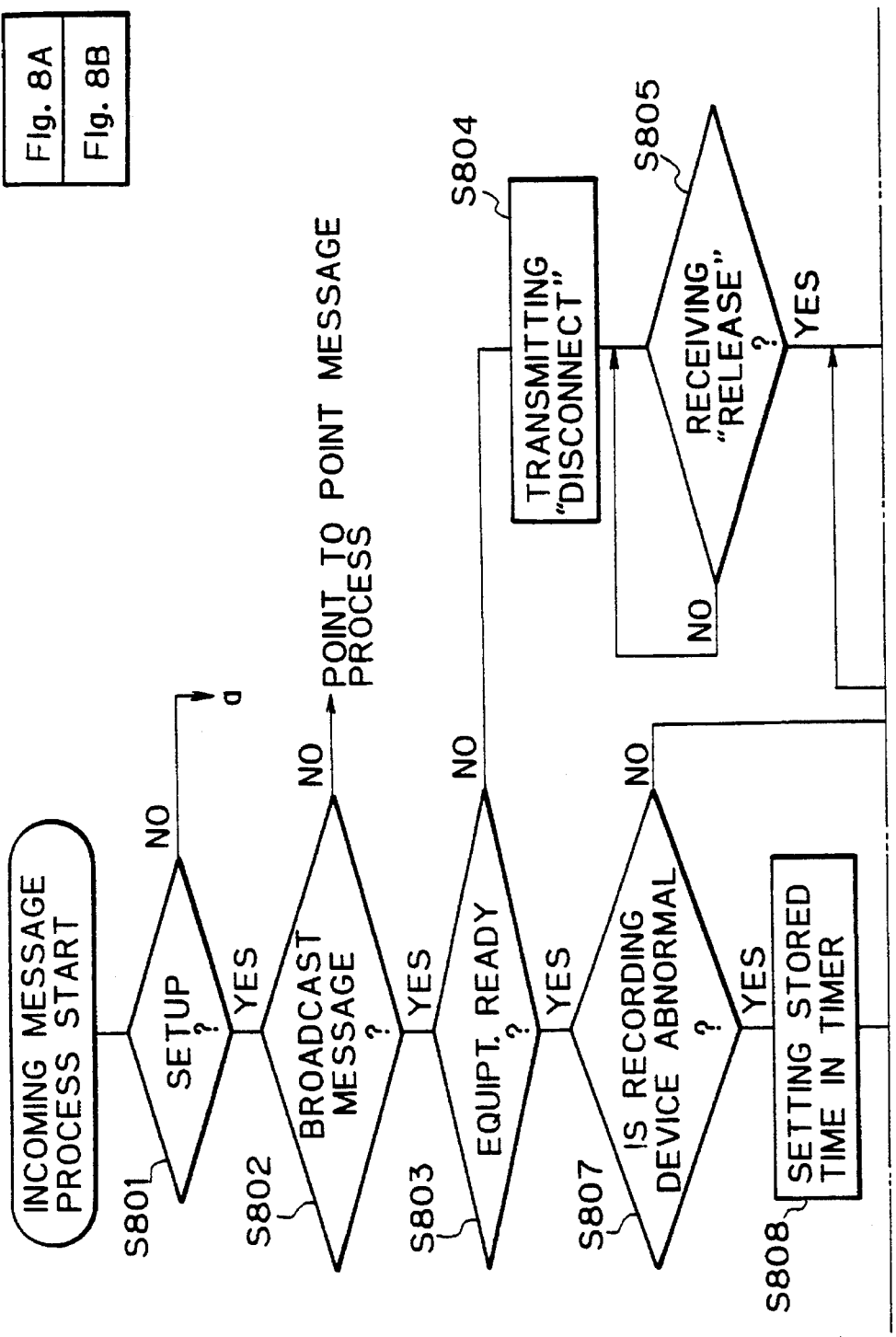

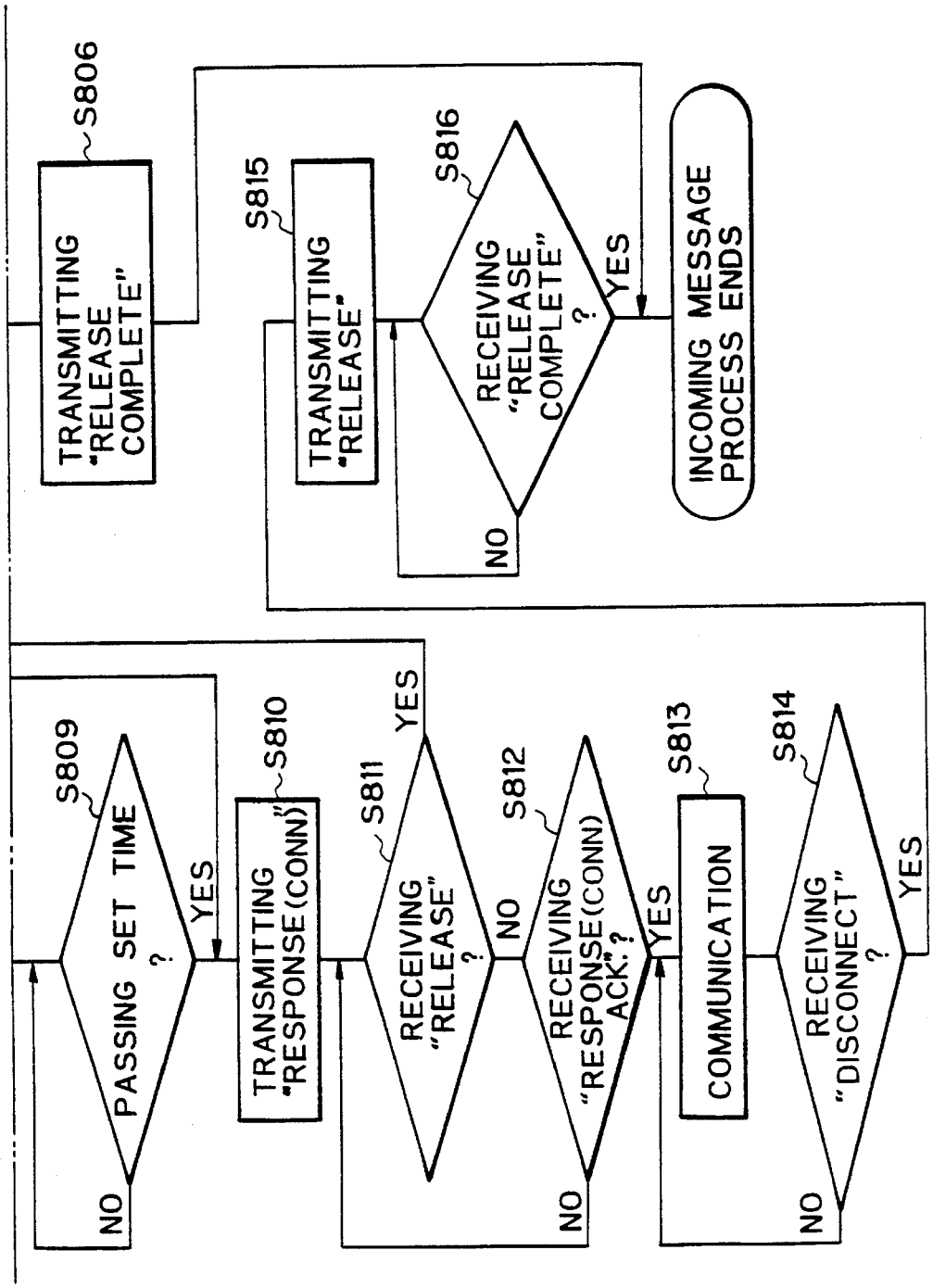

INCOMING MESSAGE PROCESSING METHOD IN PLURALITY OF TERMINAL EQUIPMENTS AND TERMINAL EQUIPMENT EXECUTING SAID METHOD

This application is a continuation, of application Ser. No. 08/096,856, filed Jul. 26, 1993, now abandoned, which is a continuation of application Ser. No. 07/667,659, filed Mar. 11, 1991, abandoned.

BACKGROUND OF THE INVENTION

1. Field of the Invention

The present invention relates to an incoming message processing method in a plurality of terminal equipments and a terminal equipment for executing the method, when a plurality of terminal equipments are connected to one line, and more particularly to an incoming message processing method in a plurality of terminal equipments and a terminal equipment for executing the method wherein one of the plurality of terminal equipments connected to the line has priority in accordance with a predetermined response time in each terminal equipment. For example, in an ISDN (Integrated Service Digital Network), a maximum of eight terminal equipments can be connected on one line.

2. Description of the Related Art in an ISDN, for example, when a message is sent to eight terminal equipments of the same kind (e.g, facsimile device) on one line, not using a subaddress or direct dial system but using a broadcast method, only the terminal equipment which returns the earliest response can receive the message.

If the terminal equipment which returns the earliest response is a facsimile comprising a memory, and the facsimile has no paper, a paper jam, or an abnormality in the recording device, the facsimile receives the message and stores the message in memory until the memory is full. Even if a facsimile which did not return the earliest response is operating normally, it cannot receive or print the message. As a result, the printed message only can be obtained by correcting the abnormality in the facsimile which received the message, thus causing a delay in the printing of the message.

The related art regarding this invention, is disclosed in Japanese Unexamined Patent Publication (Kokai) No. 59-89065.

SUMMARY OF THE INVENTION

An object of the present invention is to provide an incoming massage processing method in a plurality of terminal equipments on one line and a terminal equipment for executing the method wherein a response from an abnormal terminal equipment is delayed and a normal terminal equipment receive the message.

Another object of the invention is to provide an incoming message processing method in a plurality of terminal equipments wherein each terminal equipment returns a response after a predetermined time in response to the state of each terminal equipment.

Another object of the invention is to provide a terminal equipment which returns a predetermined delayed response when the terminal equipment is in a predetermined abnormal state.

Further another object of the invention is to provide a terminal equipment wherein the terminal equipment can set a response delay time when an abnormal state occurs.

In an aspect of the present invention there is provided an incoming message processing method in a plurality of terminal equipments wherein the plurality of terminal equipments are connected to one line of a network, comprising steps of presetting a delay time for response when an abnormal state exists in a terminal equipment, returning a response delayed by the predetermined preset delay time from the abnormal terminal equipment when a message is received through the one line, acknowledging the response from the network for only one of the terminal equipment which returns the earliest response, and communicating between only the terminal equipment which receives the acknowledgement and another terminal equipment connected to another line through the network.

In another aspect of the invention there is provided a terminal equipment for executing an incoming message processing method comprising a response delay time table for storing a delay time by which a response from the terminal equipment is delayed when the terminal equipment is in an abnormal state, a terminal equipment state determination portion for determining whether the terminal equipment is normal or abnormal, and for transmitting the delay time stored in the response delay time table when the terminal equipment is in an abnormal state, and a response delay time controller for receiving the delay time from the terminal equipment state determination portion, and for returning a response to the network delayed by the delay time.

Other features and advantages of the invention will be apparent from the following description with reference to the accompanying drawings.

BRIEF DESCRIPTION OF THE DRAWINGS

FIG. 1 which comprises FIG. 1A

FIG. 5 is a block diagram showing a facsimile device in the embodiment of FIG. 2;

FIGS. 6A and 6B are front views of a display picture in the embodiment of FIG. 5;

FIG. 7 which comprises FIG. 7A

FIG. 8 which comprises FIG. 8A and FIG. 8B is a flowchart for explaining an incoming message process in the embodiment of FIG. 2;

DESCRIPTION OF THE PREFERRED EMBODIMENTS

Figure 1B:
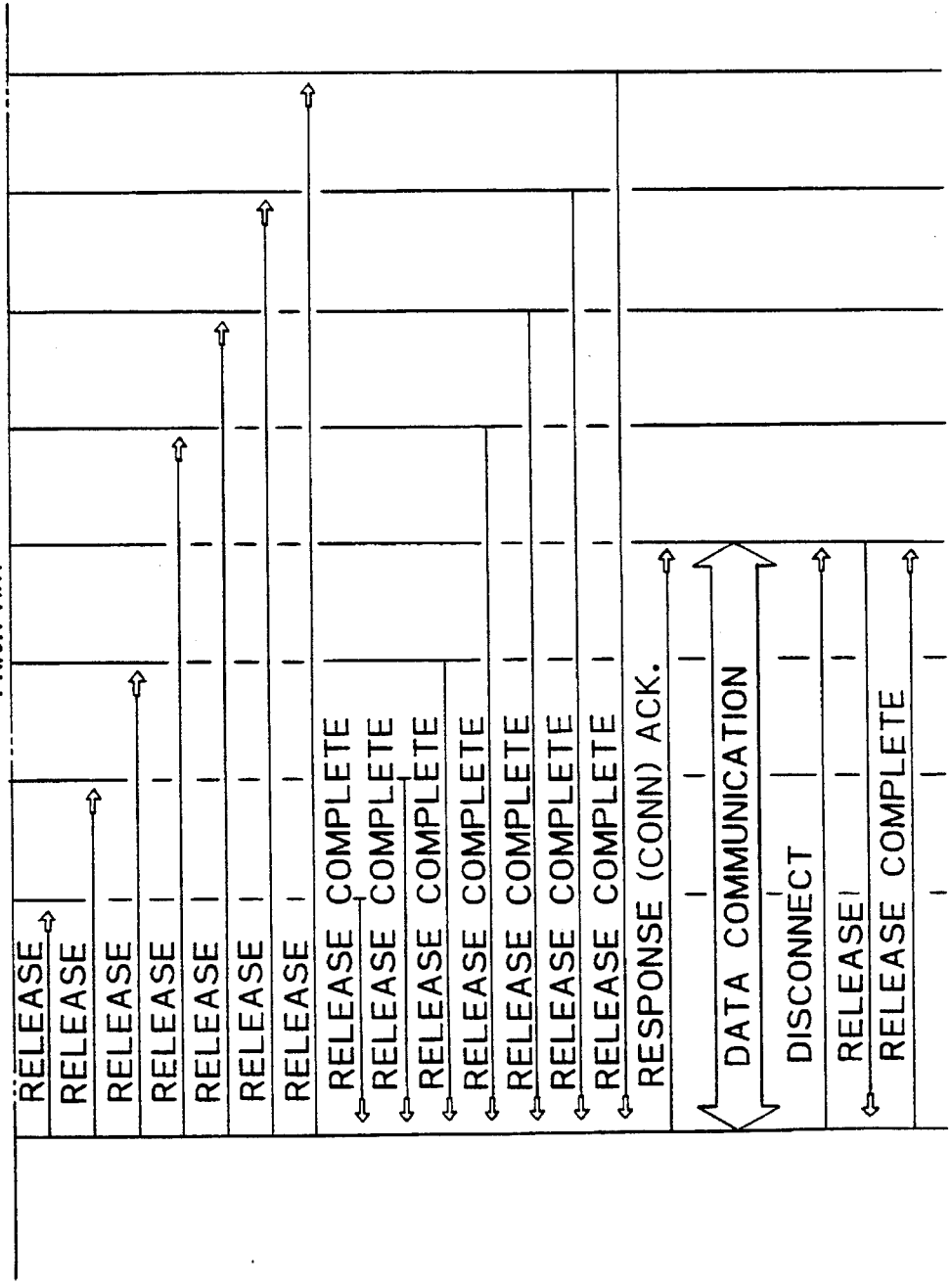
FIG. 1B is an explanatory diagram showing a related art.

Prior to explaining an embodiment of the present invention, the related art is explained with reference to FIG. 1.

In the figure, reference numeral 1-1 is a terminal equipment, 38 is a DSU (Digital Service Unit), and 15 is an ISDN.

As shown in FIG. 1, eight terminal equipments TEA to TEH each of which are the same kind of terminal equipment 1-1 e.g., facsimile device, are connected to one line. When a message is received in a broadcast form, instead of as a subaddress or by direct dial, only the terminal equipment which returns the earliest response can receive the message. Accordingly, in accordance with the states of the equipments (e.g., no paper or paper jam etc.), the terminal equipment which can receive the message is determined.

In FIG. 1, for example, a communication sequence in the case when the terminal equipment TED returns the earliest response to the ISDN 15, is shown.

In this case, the order of the responses is TED, TEC, TEB, TEA, TEE, TEF, TEG, TEH. Release signals are then sent from the ISDN 15 to all the terminal equipments except for the terminal equipment TED and the terminal equipments report a release completion to the ISDN. After that, the terminal equipment TED can communicate with another terminal equipment 1-2 connected to another line through the ISDN 15.

In the explanations regarding the related art or an embodiment of this invention, the reference numerals of the terminal equipment are used as follows:

A terminal equipment connected to one line: 1-1

A terminal equipment connected to another line: 1-2

In eight terminal equipments connected to one line when the order is necessary for explaining: TEA to TEH Next, an embodiment according to the present invention is explained with reference to FIGS. 2 and 3.

Figure 2:
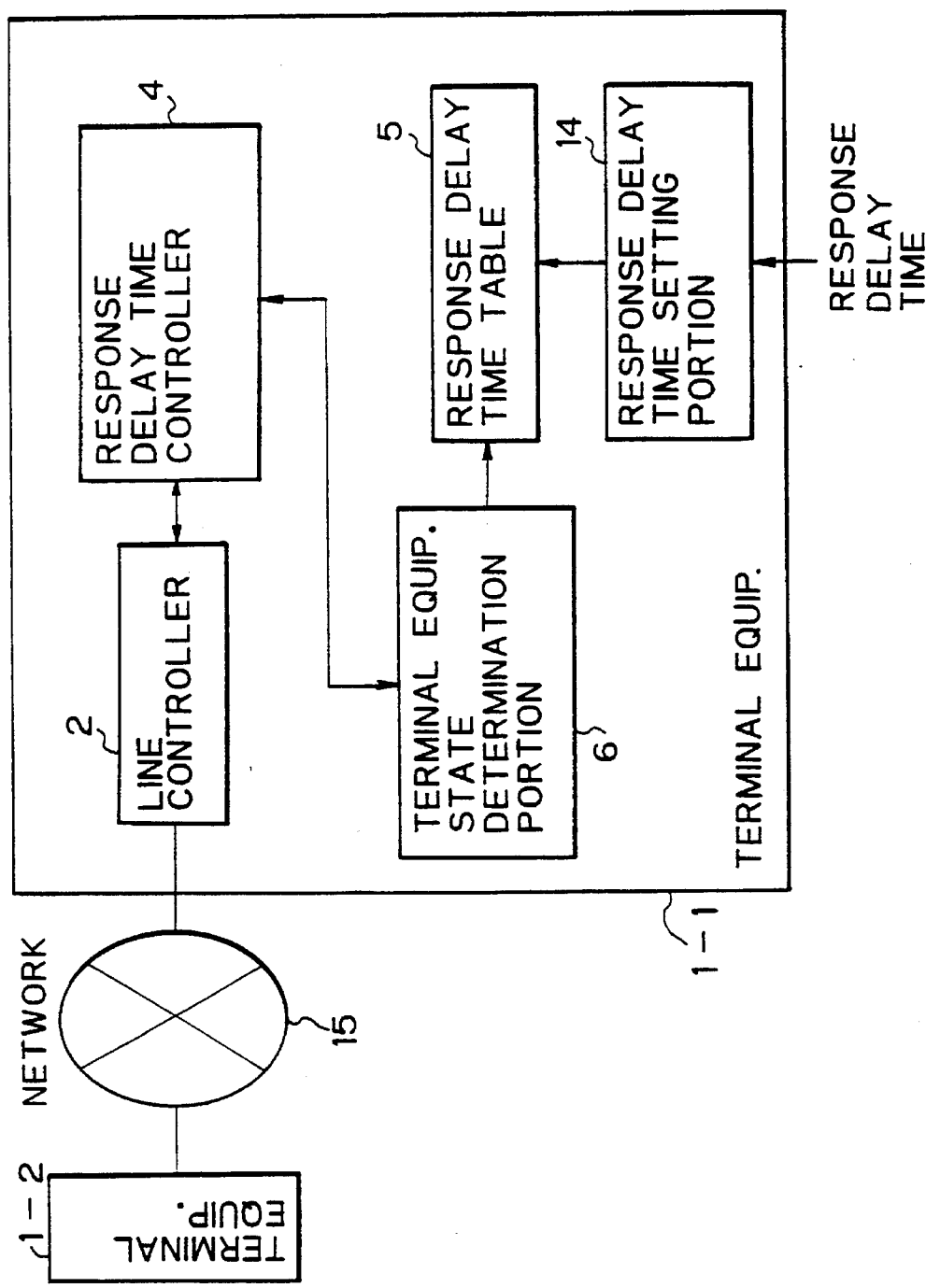
FIG. 2 is a block diagram showing an embodiment according to the present invention.

In FIG. 2, reference numeral 2 is a line controller, 4 is a response delay time controller, 5 is a response delay time table, 6 is a terminal equipment state determination portion, 14 is a response delay time setting portion, and 15 is a network (ISDN).

One terminal equipment 1-1 and other terminal equipments are connected to the network 15 through one line and another terminal equipment 1-2 is connected to another line. The terminal equipments TEA to TEH (e.g., facsimile devices), are connected to one line and can communicate with another terminal equipment 1-2 connected to another line.

The response time table 5 stores a delay time $T_2$ and/or delay time $T_1$. The time $T_2$ is a response delay time when the terminal equipment is in an abnormal state, and the time $T_1$ is a response delay time when the terminal equipment is operating normally.

The terminal equipment state determination portion 6 determines whether the terminal equipment 1-1 which comprises the terminal equipment state determination portion 6, is normal or abnormal, and if normal, the delay time $T_1$ is sent to the response delay time controller 4. If the terminal equipment is abnormal, the delay time $T_2$ is sent to the response delay time controller 4.

The response time controller 4 returns a response (in CCITT Recommendation, abbreviated as CONN) delayed by time $T_1$ to the network 15 when the terminal equipment is normal, namely, the time $T_1$ is sent. On the other hand, when the terminal equipment is abnormal, i.e., when the delay time $T_2$ is sent, a response is returned to the network 15 delayed by the time $T_2$.

The response delay time setting portion 14 sets the delay times $T_2$ and/or $T_1$. The delay time $T_2$ and/or $T_1$ are supplied from an external source to the response delay time table 5, and stored in the response time setting portion 14.

Figure 3:
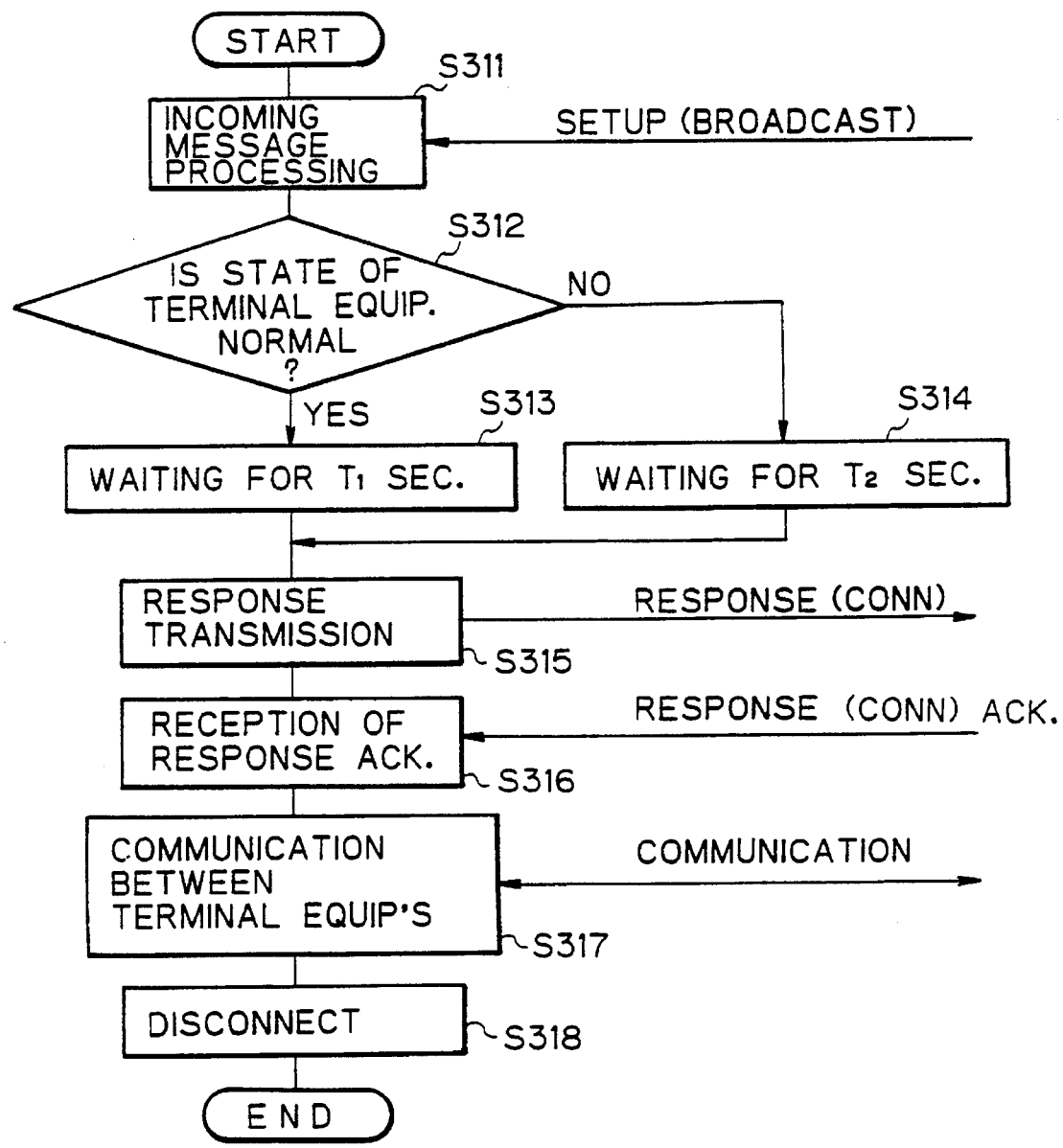
FIG. 3 is a flowchart showing processes of the embodiment of FIG. 2.

FIG. 3 is a flowchart of the incoming message processing showing the process steps of the embodiment of FIG. 2.

Prior to the incoming message processing, the delay time $T_2$ and/or $T_1$ is input and set. Namely an operator can externally input the delay time $T_2$ and/or $T_1$ to the respective terminal equipment 1-1.

The response delay time setting portion 14 stores the delay time $T_2$ and/or $T_1$ which is input by the operator in a predetermined position in the response delay time table 5.

Accordingly, the operator can set the delay time $T_2$ and/or $T_1$ as desired.

Below, the processing steps are explained.

S311:

The incoming message processing is started. Namely, a SETUP (which is defined in CCITT Recommendation Q. 931) by a broadcast form is received by the plurality of terminal equipments which are connected to the one line.

S312:

The state of the terminal equipment 1-1 is determined to be normal or abnormal. Namely, the terminal equipment state determination portion 6 determines whether the state of the terminal equipment 1-1 is normal or abnormal.

The abnormal state could include no paper in the facsimile device, a paper jam, abnormality of a recording device 10, or the like.

S313:

If YES is determined in the step S312 (i.e., normal state), the process waits for the time $T_1$ (e.g., 0 sec).

S314:

If NO is determined in the step S312 (i.e., abnormal state), the process waits for the time $T_2$ which is preset to be sufficiently long in comparison with the time $T_1$.

S315:

Responses are transmitted to the network (ISDN) 15 from each terminal equipment 1-1 with a respective terminal equipment ID (Identification).

S316:

A response acknowledgement (CONN ACK) including the terminal equipment ID is received by one of the terminal equipment from the network 15. For example, if the ISDN 15 first receives a response from the terminal equipment 1-1, the terminal equipment 1-1 receives the transmitted CONN ACK. The other terminal equipment receives a release signal with the respective terminal equipment ID.

S317:

Terminal equipment 1-1 receiving the CONN ACK in the step S316 communicates with the other terminal equipment 1-2. For example, on facsimile device receives image data transmitted from the other facsimile device and prints out the image. When the paper in the facsimile device is used up, after the time $T_2$, the response of the step S315 is sent to the network 15. Therefore, another normal facsimile device can receive the CONN ACK and print out the message.

S318:

In this step, a disconnection process is carried out.

As mentioned above, in this embodiment, the one line from the ISDN 15 is connected to the plurality of terminal equipments as shown in FIG. 1, the delay time $T_2$ is preset in the response delay time table 5, by which delay time $T_2$ the response is delayed when an abnormal state exists in the terminal equipment, when the plurality of terminal equipment receive the SETUP through the one line, the abnormal terminal equipment returns a response delayed by a preset delay time $T_2$, the network sends a CONN ACK to only the terminal equipment 1-1 which returns the earliest response to the network, and only the terminal equipment 1-1 receiving the CONN ACK communicates with the other terminal equipment 1-2.

Accordingly, when the plurality of terminal equipments are connected to one line, the abnormal terminal equipment responds with delay time, and the normal terminal equipment receives the message and can communicate with the other terminal equipment 1-2.

Next, the embodiment of FIG. 2 is explained in detail with reference to FIGS. 4 to 9.

A plurality of terminal equipments (e.g., facsimile devices) are connected to one line and these terminal equipments communicate with each other through the network. The eight terminal equipments (TEA to TEH) can be connected to the ISDN through the line and the DSU (Digital Service Unit) 38. Each terminal equipment (TEA to TEH) has a subaddress and receives information of identification by the subaddress. In the case of a broadcast message, all the terminal equipments (TEA to TEH) receive the message.

Figure 4:
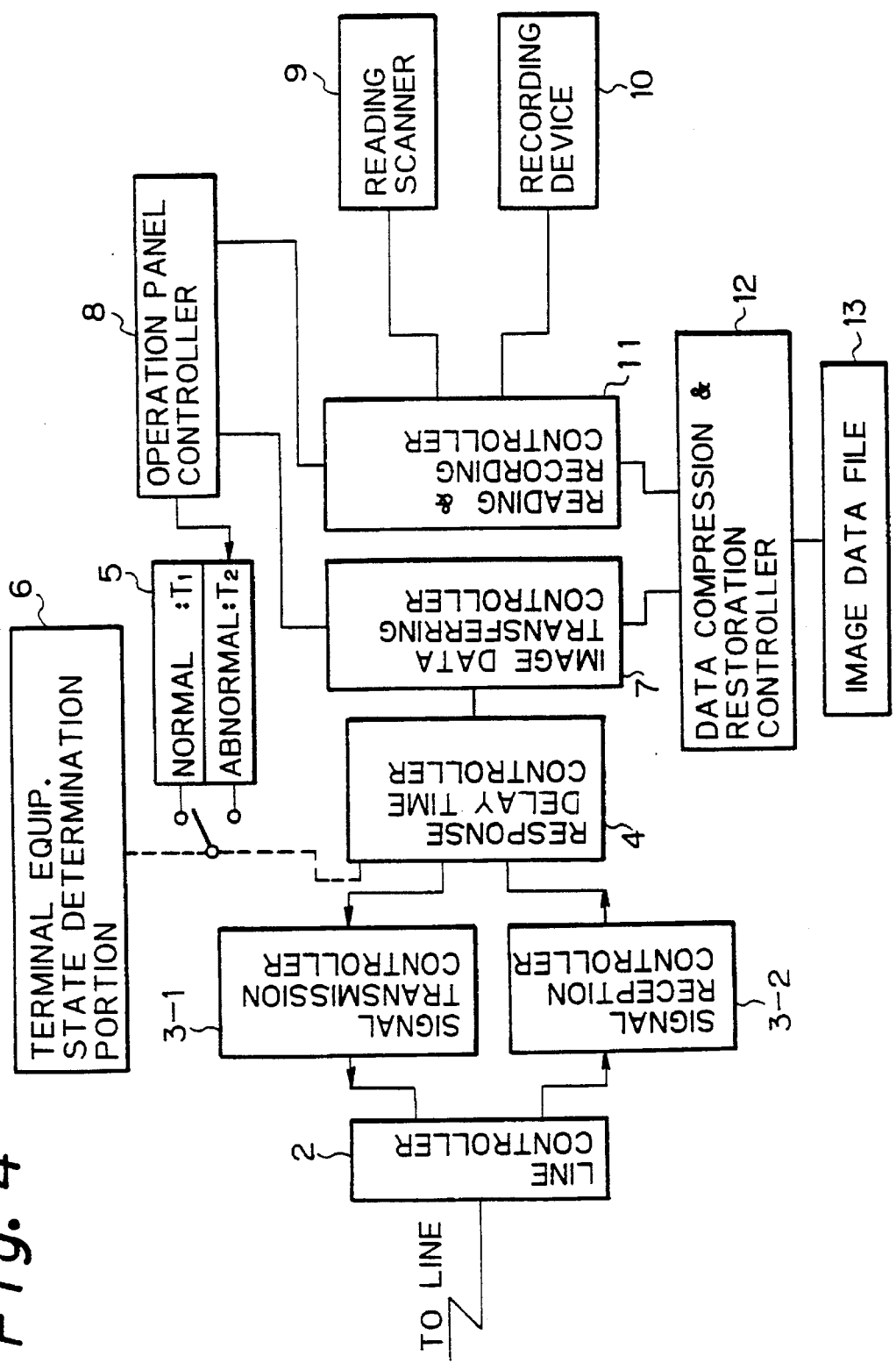
FIG. 4 is a detailed block diagram showing the embodiment of FIG. 2.

In FIG. 4, the constitution of the terminal equipment according to the embodiment of this intention is shown. In the figure, a line controller 2 in terminal equipment 1-1 controls the line and transmits or receives data to the other terminal equipment 1-2 through the ISDN 15.

A signal transmission controller 3-1 controls signal transmission, namely, controls the transmission of image data, response, release, and release completion or the like to the ISDN 15. The delay time of the transmission of the response is determined by the response delay time controller 4.

A signal reception controller 3-2 controls signal reception, namely, controls the reception of image data, response acknowledgement (CONN ACK), release, disconnection, and release completion or the like from the ISDN 15.

The response delay time controller 4 returns a response to the ISDN 15 after a time $T_1$ or $T_2$ which are set in the response time table 5, when SETUP arrives from the ISDN 15.

The response time table 5 stores the delay time $T_1$ when the terminal equipment is operating normally, and the delay time $T_2$ when the terminal equipment is abnormal, which delay times are input and set by an operator through an operation panel controller 8. The delay time $T_1$ may be zero seconds. In this case, the response time is determined by the proper characteristics of the equipment.

The operation panel controller 8 controls an operation panel, receiving input from an operator, and displays the state of the terminal equipment 1-1 on a liquid crystal display (LCD) or the like. The operation panel controller 8 includes a response delay time setting portion 14, and stores the time $T_1$ and/or $T_2$ which the operator inputs from the operation panel, at the predetermined position in the response time table 5. The operation panel 8 or the response delay time setting portion 14 displays the time $T_1$ and/or $T_2$, takes in the time $T_1$ and/or $T_2$ on the picture, and stores the same in the response delay time table as mentioned above.

The terminal equipment state determination portion 6 determines whether the terminal equipment 1-1 is normal or abnormal, and inputs either $T_1$ seconds or $T_2$ seconds in the response delay time table 5 into the response delay time controller 4 in accordance with the normal or abnormal state of the terminal equipment.

A reading scanner 9 reads information and converts the information into image data.

A recording device 10 prints image data.

A reading and recording controller 11 controls the reading or recording by the reading scanner 9 and the recording device 10, in accordance with the control signal from the operation panel controller 8.

A data compression and restoration controller 12 compresses data, stores the data in an image data file 13, and restores compressed data from the image data file 13.

The image data file 13 is a file (memory) for storing the image data.

An image data transferring controller 7 controls transfer of the image data. Namely, the image data transferring controller 7 stores the image data transmitted from the other terminal equipment 1-2 in the image data file 13 through the data compression and restoration controller 12, and further takes out the image data from the image data file 13 through the data compression and restoration controller 12 and transmits the image data to the other terminal equipment 1-2.

FIG. 5 shows a facsimile device in this embodiment.

A key pad 21 and an LCD 23 are included in the operation panel. A key input controller 22 and a display controller 24 comprise a portion of the operation panel controller 8.

The delay time $T_2$ or the like by which the response from the facsimile device is delayed when an abnormal state exists, are input by using the key pad 21.

The key input controller 22 receives the key input from the key 21.

The LCD 23 displays the contents of the key input from the key pad 21.

The display controller 24 displays many kinds of information on the LCD.

A file memory 25 stores coded image data (compressed image data) and corresponds to the image data file 13 in FIG. 4.

A communication controller 26 communicates with another facsimile device thought the line and network, and corresponds to the line controller 2, the signal transmission controller 3-1, and the signal reception controller 3-2 in FIG. 4.

A ROM (Read Only Memory) 27 stores a program by which a MPU (Micro Processor Unit) 20 carries out various processes.

A memory 28 (RAM: Random Access Memory) for program work stores various processing programs and is a memory (RAM) for working area of program.

The above-mentioned controllers 2, 3-1, 3-2, 4, 7, 8, 11, and 12, and the terminal equipment state determination portion 6 are constituted by the MPU 20 and the various processing programs stored in the ROM 27 and the memory 28.

A memory 29 for holding data is a memory backed up by a battery for storing various setting data, and, for example, stores the response delay time table 5.

A CG circuit 30 develops dot data corresponding to the character code by reading from the character image ROM 31.

The character image ROM 31 stores the dot data corresponding to the code.

By using the CG circuit 30 and the character image ROM 31, display character in FIGS. 6A and 6B is obtained.

A compression and restoration circuit 32 is a circuit for compressing and restoring image data and is a portion of the data compression and restoration controller 12.

A recording controller 33 prints received image data on paper using a printer 34.

A reading controller 35 reads a manuscript using a scanner 36 and forms image data.

The recording controller 33 and the reading controller 35 are a portion of the reading and recording controller 11.

FIGS. 6A and 6B are explanatory diagrams of a delay time input display. FIG. 6A shows a state of the operation panel 37 when the time input data is displayed on the LCD 23.

On the LCD 23, the display "INPUT RESPONSE DELAY TIME" is displayed requesting the input of the response delay time $T_2$ from the operator. The operator inputs the response delay time $T_2$ using the key pad 21 in response to the request.

FIG. 6B shows a sequence of displays of the time input processes. As shown in the figure, when the operator pushes a function key at the READY IMAGE (PICTURE NO. 1) display, a function selection picture (PICTURE NO. 2) is displayed.

Assuming that the function "1" is allocated to the process of the registration of the response delay time $T_2$, the operator pushes key "1". In response, a time input display (PICTURE NO. 3) is displayed. This state corresponds to FIG. 6A. If the response delay time $T_2$ can be set in 100 millisecond steps, the operator pushes "1" and then pushes "0". As a result, the response delay time is set to 1000 milliseconds (i.e., 1 second) (PICTURE NO. 4).

After that, when the operator pushes the SET key, the picture returns to the "READY IMAGE" display, and the input response delay time is stored in the predetermined position.

The above display shows an example wherein the operator can set only the response delay time $T_2$. In this example, the response delay time $T_1$ is predetermined, for example, "0 milliseconds". Namely, if the terminal equipment can receive a message and is normal, a response is returned immediately.

Further, the operator may set the response delay times $T_1$ and $T_2$ instead of only the response delay time $T_2$. In this case, for example, the time input display is twice as long. Namely, first, the picture for inputting the response delay time $T_1$ is displayed and the operator operates the key pad, and then, the picture for inputting the response delay time $T_2$ is displayed.

Figure 7B:
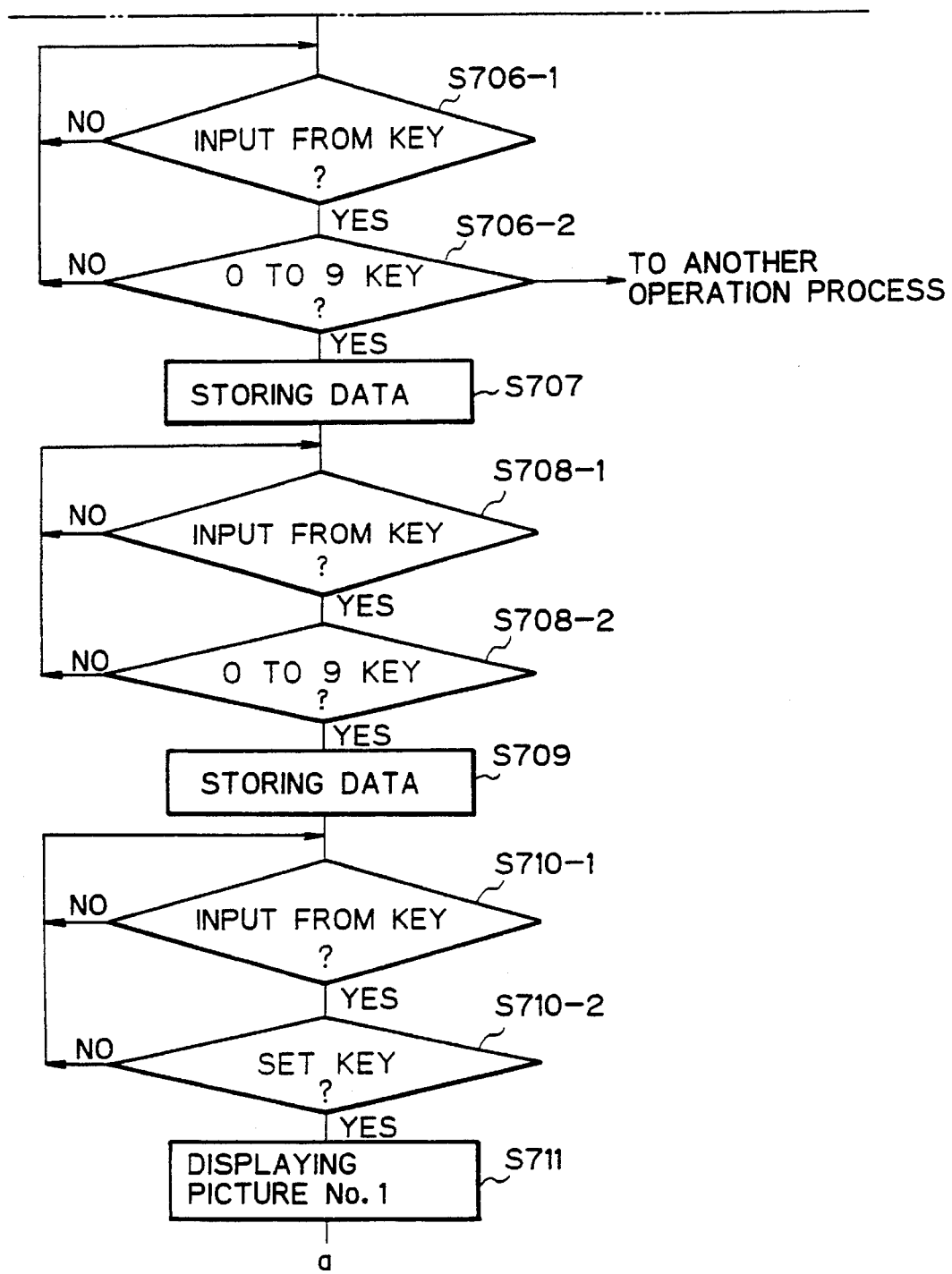
FIG. 7B is a flowchart of a setting process of a response delay time in the embodiment of FIG. 2.

In FIG. 7 which comprises FIG. 7A and FIG. 7B, the processing flow for the response delay time setting is shown. Each process step is explained as follows:

S701 (S701-1, S701-2):

The terminal equipment 1-1 is ready for message reception or ready for key input. If a message is received, the incoming message process starts. If neither a message or key input are received, the ready state continues. In this state, the LCD 23 indicates "READY IMAGE" as shown in FIG. 6B.

S702:

When the key input is received, the operation panel controller 8 determines whether the input is a function key input or not. If the input is not from a function key, another operation process (a process other than the response delay time setting process) is carried out.

S703:

If the input is from a function key (F), the operation panel controller 8 displays the function selection picture.

S704 (S704-1, S704-2):

The operation panel controller 8 becomes ready for key input.

If a key input is not received, the ready state continues.

If a key input is received, the operation panel controller 8 determines whether the "1" key is pushed or not.

If the input is not from the "1" key, another operation process is carried out.

S705:

If the input of the "1" key is received as a function, for example, the control process is transferred from the operation panel controller 8 to the response delay time setting portion 14, and the response delay time setting portion 14 displays a time input display.

S706 (S706-1, S706-2)

The response delay time setting portion 14 becomes ready for the key input.

If the key input is not received or the key input is other than "0" to "9", the ready state (i.e., waiting) continues, and if again a key input other than "0" to "9" is received, the process control returns to the operation panel controller 8 and another process (e.g., error process) is carried out.

S707:

If one of the key inputs "0" to "9" is received, the response delay time setting portion 14 stores the input value in a predetermined position in the response delay time table 5.

S708 (S708-1, S708-2):

The response delay time setting portion 14 becomes ready for the key input.

If the key input is not received or a key input other than "0" to "9" is received, the ready state continues.

S709:

The same process as the process step S707 is carried out.

S710 (S710-1, S710-2)

After the process step S709, the process control returns to the operation panel controller 8, and the process waits for the predetermined key input and input of the SET key.

S711:

If the input of the SET key is received, the operation panel controller 8 displays the READY IMAGE.

In FIG. 8 which comprises FIG. 8A and FIG. 8B, a flowchart of an incoming message processing is shown. Below steps of the processing are explained.

S801:

The determination of whether the signal reception controller 3-2 receives a SETUP or not is carried out.

If the SETUP is not received, for example, the process of the following a in FIG. 7 is carried out.

S802:

If the SETUP is received, in the signal reception controller 3-2, the determination whether the incoming message is in a broadcast form or not is carried out.

If the incoming message is not in a broadcast form, since the message is designated by a subaddress, a process of point to point reception is executed.

S803:

If the message is in broadcast form, in the signal reception controller 3-2 or the terminal equipment state determination portion 6, the determination of whether the terminal equipment 1-1 comprising them is able to receive or not is made.

S804:

If the terminal equipment cannot receive the message, the signal transmission controller 3-1 transmits a "DISCONNECT" signal to the ISDN 15.

S805:

The signal reception controller 3-2 waits for a signal "RELEASE" from the ISDN 15.

S806:

If the signal reception controller 3-2 receives the signal "RELEASE", the signal transmission controller 3-1 transmits a signal "RELEASE COMPLETE" to the ISDN 15, and the process ends.

S807:

In the step S803, if the terminal equipment can receive the message, the terminal equipment 1-1 is examined to determine whether the terminal equipment 1-1 is abnormal or not, in the terminal equipment state determination portion 6.

S808:

If the terminal equipment 1-1 is abnormal, in the response delay time controller 4, the delay time $T_2$ for the abnormal state is taken out from the response delay time table 5, and the delay time $T_2$ is set in a timer, and the timer is then started. The response delay time controller 4 is provided with a timer for this purpose.

S809:

The response delay time controller 4 waits for the passing of the setting time in the timer.

S810:

When the setting time of the timer is passed and in the step S807, the terminal equipment 1-1 comprising the timer is normal, the signal transmission controller 3-1 receiving the above instructions transmits the signal "RESPONSE (CONN)" to the ISDN 15. Namely, in the abnormal state of the terminal equipment, the response returns delayed by the time $T_2$, and in the normal state, the response returns immediately.

S811:

The determination of whether the signal reception controller 3-2 receives the signal "RELEASE" or not is carried out.

When the signal reception controller 3-2 receives the signal "RELEASE", since another terminal equipment 1 which is connected to the same line has already returned the "RESPONSE (CONN)", the process step S806 is performed.

S812:

When the signal "RELEASE" is not received, the determination of whether the signal reception controller 3-2 received a signal "RESPONSE (CONN) ACK" or not is executed.

When the signal "RESPONSE (CONN) ACK" is not received, the process following the step S811 is repeated.

S813:

When the signal "RESPONSE (CONN) ACK" is received, the terminal equipment 1-1 can communicate with the other terminal equipment 1-2 which transmits the "SETUP". For example, the terminal equipment 1-1 receives image data transmitted from the other terminal equipment 1-2, stores the image data once in the image data file 13, and then prints using the recording device 10.

S814:

The determination of whether the signal reception controller 3-2 received the signal "DISCONNECT" or not is carried out.

If the signal "DISCONNECT" is not received, the process step S813 is repeated.

S815:

If the signal reception controller 3-2 received the signal "DISCONNECT", the signal transmission controller 3-1 transmits the signal "RELEASE" to the ISDN 15.

S816:

The determination of whether the signal reception controller 3-2 received the signal "RELEASE COMPLETE" or not is carried out.

If the signal reception controller 3-2 does not receive the signal "RELEASE COMPLETE", the process step S816 is repeated.

If the signal reception controller 3-2 received the signal "RELEASE COMPLETE", the incoming message process ends.

Figure 9A:
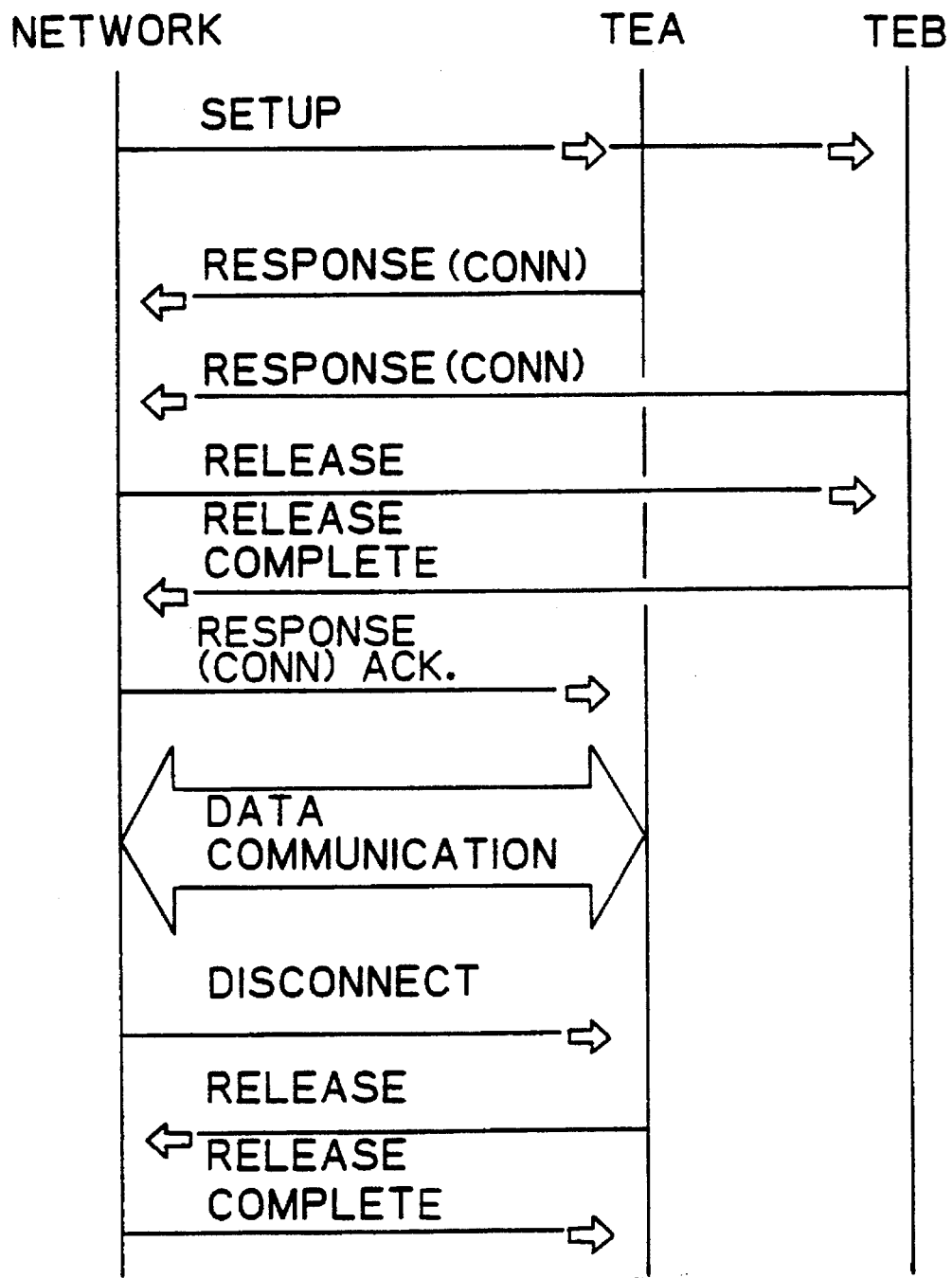
FIG. 9A, FIG. 9B, and FIG. 9C are diagrams showing communication sequences in the embodiment of FIG. 2.
Figure 9B:
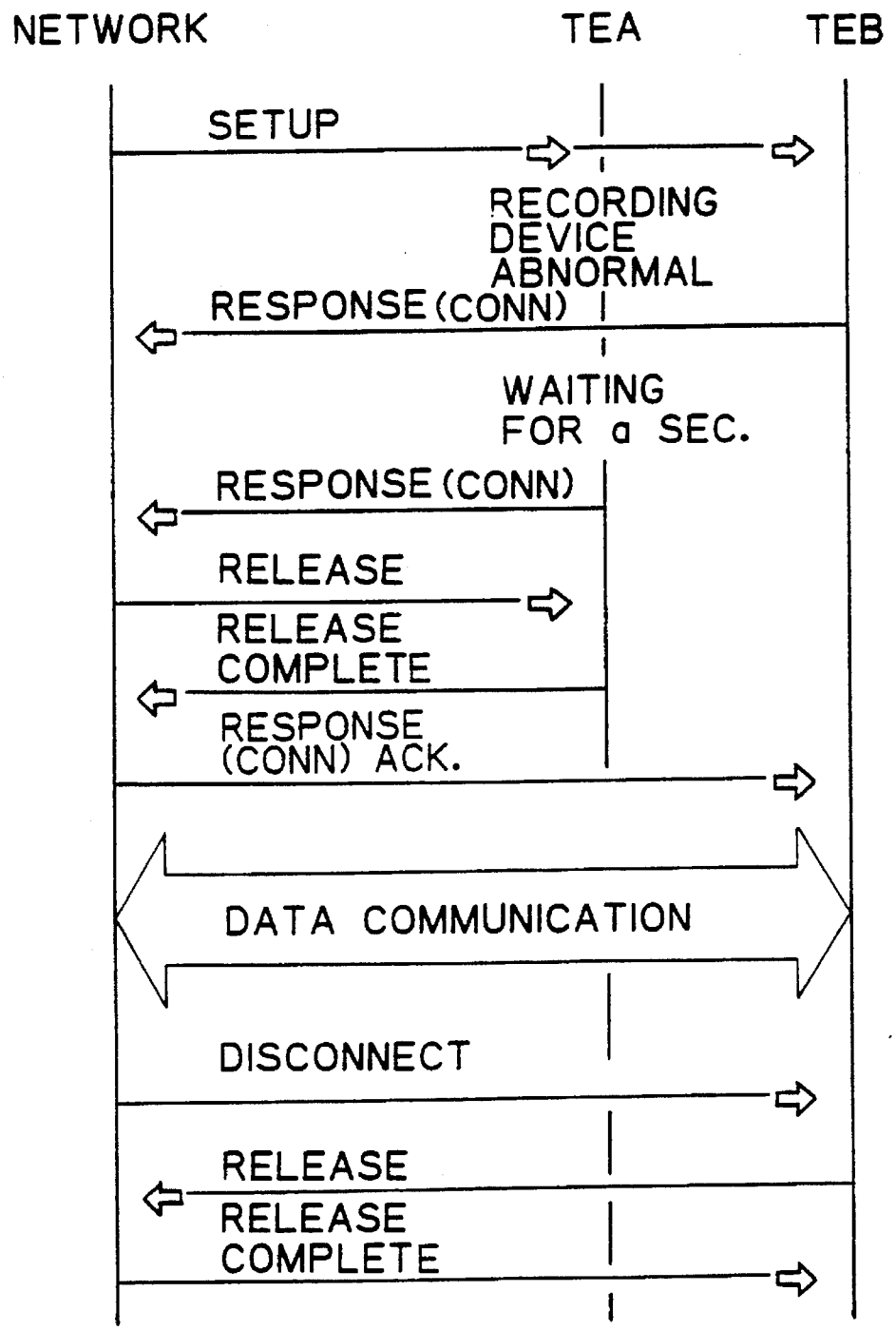
Figure 9C:
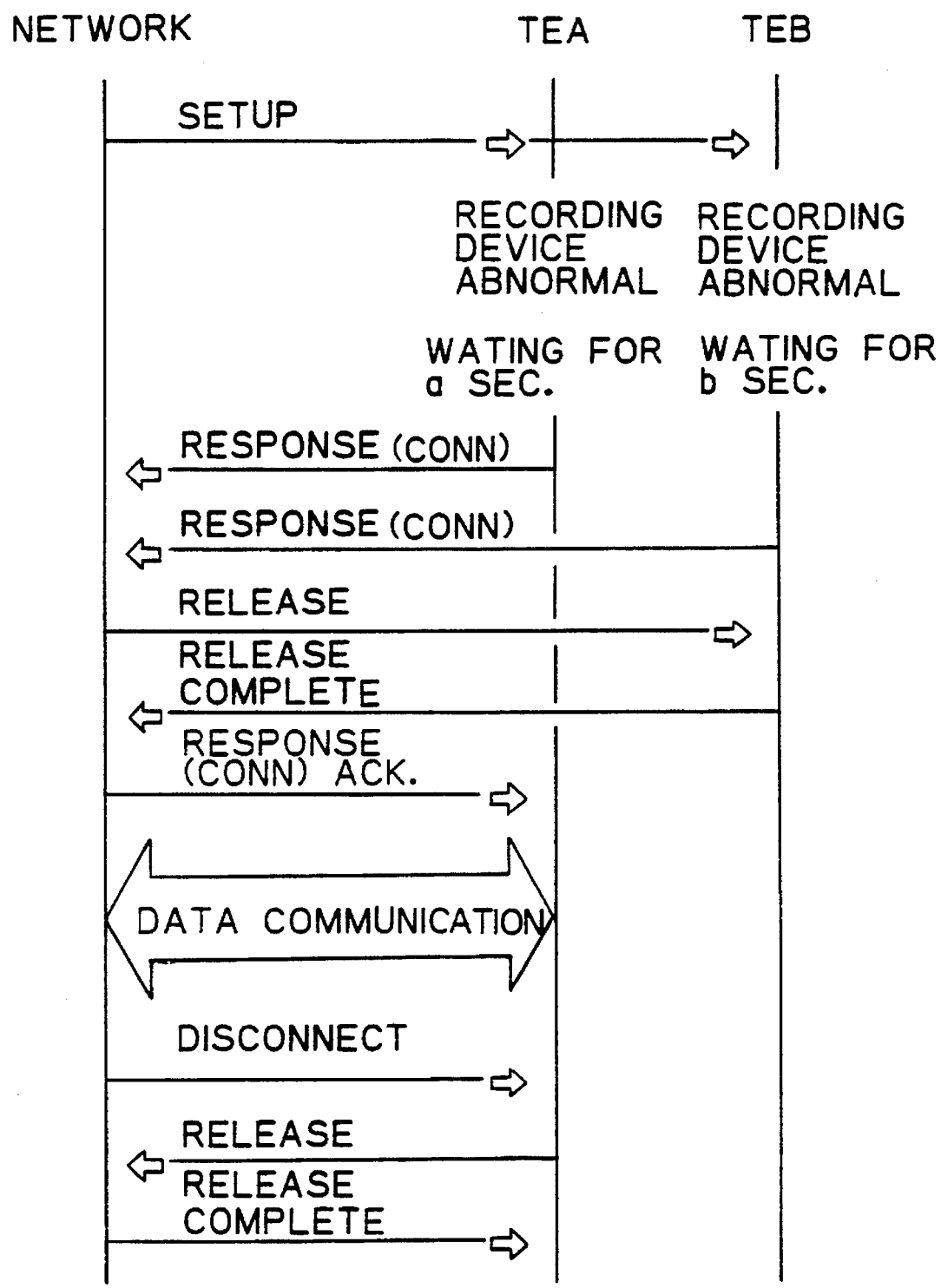

In FIGS. 9A, 9B and 9C, the communication sequences for three examples are shown. In these communication sequences, as a matter of convenience, two terminal equipments TEA and TEB are connected to one line. Under normal condition the terminal equipment TEA always responds earlier than the terminal equipment TEB in accordance with the difference in distance between the ISDN 15 and the terminal equipments TEA and TEB. The following explanations are given based on the above assumption.

In FIG. 9A, the communication sequence when both the terminal equipments TEA and TEB are normal is shown.

In response to the SETUP in broadcast form from the ISDN 15, both the terminal equipments TEA and TEB return a response, however, the response from the terminal equipment TEA is earlier.

The ISDN 15 sends the signal "RELEASE" to the terminal equipment TEB, and the terminal equipment TEB returns the signal "RELEASE COMPLETE" to the ISDN 15 as shown in the process step S811 in FIG. 8. On the other hand, the ISDN 15 sends the signal "RESPONSE (CONN) ACK" to the terminal equipment TEA.

Thus, the terminal equipment TEA communicates through ISDN 15 as shown in the process steps S812 and S813 in FIG. 8.

Then, the terminal equipment TEA receiving the signal "DISCONNECT" from the ISDN 15 as shown in the process step S814 in FIG. 8, transmits the signal "RELEASE" as shown in the process step S815 in FIG. 8 and receives the signal "RELEASE COMPLETE" from the ISDN 15 as shown in the process step S816 in FIG. 8.

FIG. 9B shows the communication sequence in the case when an abnormality occurs in the terminal equipment TEA.

The terminal equipment TEB receiving the SETUP returns the response immediately, however, the terminal equipment TEA in an abnormal state returns the signal "RESPONSE (CONN)" after a second (predetermined delay time $T_2$) as shown in the process steps S807 to S810 in FIG. 8. Thus, the response of the terminal equipment B is earlier.

As a result, the ISDN 15 transmits the signal "RESPONSE (CONN) ACK" to the terminal equipment TEB, and the terminal equipment TEB which is in a normal state communicates through the ISDN 15.

FIG. 9C shows the communication sequence in the case when both the terminal equipments TEA and TEB become abnormal.

Since the terminal equipments TEA and TEB receiving the SETUP are abnormal, both responses return after the delay time $T_2$. Assuming that the delay times $T_2$ of the terminal equipments TEA and TEB are a second and b second, respectively, and a is shorter than b, as a result, the "RESPONSE (CONN)" of the terminal equipment TEA is earlier.

Accordingly, the terminal equipment TEA can communicate through the ISDN 15. Thus, when both the terminal equipments TEA and TEB are abnormal, the priority of the terminal equipment TEA over the terminal equipment TEB regarding response time is maintained.

In addition, if a is set sufficiently longer than b, when both the terminal equipments TEA and TEB are abnormal, the terminal equipment TEB always can receive the message.

As mentioned above, in the present invention, by delaying the response of the terminal equipment which is abnormal when a plurality of terminal equipments are connected to a line, the normal terminal equipment receives a message and can communicate with other terminal equipment connected to another line through an ISDN. Accordingly, when one line in the ISDN is connected to a plurality of terminal equipments, the response of the terminal equipment which can receive the message but is abnormal is automatically delayed, and the normal terminal equipment can communicate. Thus, for example, assuming that facsimile devices are connected to the line, when the facsimile device which send the earliest response can receive the message but is out of paper and can only receive the message by memory, the response of that facsimile device is delayed and another facsimile device which has paper can receive the message and can print it out.

I claim:

1. An incoming message processing method for data reception in a plurality of terminal equipment wherein the plurality of terminal equipment are connected to one line of a network, comprising the steps of:

(a) presetting a delay time for response when states in which receiving data cannot be printed exist in one of the plurality of terminal equipment, (b) receiving a request for response at the plurality of terminal equipment, from the network by receipt from the terminal equipment in a transmission side, (c) returning a response to the network delayed by the delay time from the one of the plurality of terminal equipment if the one of the plurality of terminal equipment is in one of the states in which receiving data cannot be printed, returning a response to the network delayed by a shorter delay time compared with the delay time in one of the states in which receiving data cannot be printed, or by no delay time from the one of the plurality of terminal equipment, if the one of the plurality of terminal equipment is in the normal state, when said request is received by the one of the plurality of terminal equipment through the one line, (d) acknowledging the response from the network only to another of the plurality of terminal equipment which returns the earliest response to the network, and (e) communicating only between the another of the plurality of terminal equipment and said terminal equipment in the transmission side connected to another line through the network.

2. An incoming message processing method as set forth in claim 1, further comprising before said returning step (c), the steps of:

(1) determining whether each of the plurality of terminal equipment is in a normal state or one of the states in which receiving data cannot be printed, (2) returning another response delayed by another predetermined time to the network, when the normal state is determined and returning the response delayed by the predetermined time which is sufficiently longer than the another predetermined time to the network when one of the states in which receiving data cannot be printed, is determined, and (3) receiving a SETUP signal from the one of the plurality of terminal equipment.

3. A terminal equipment for executing an incoming message processing method for data reception, comprising:

a response delay time table for storing a delay time by which a response from the terminal equipment is delayed when the terminal equipment is in a state in which receiving data cannot be printed, a terminal equipment state determination portion for determining whether the terminal equipment is in a normal state or the state in which the receiving data cannot be printed, and for transmitting the delay time stored in the response delay time table for the state in which receiving data cannot be printed by the terminal equipment, and a response delay time controller receiving the delay time from the terminal equipment state determination portion, and for returning the response to the network delayed by the delay time, permitting the network to receive other responses from other terminal equipment in the normal state before the response delayed by the delay time.

4. A terminal equipment as set forth in claim 3, wherein the response delay time table stores another delay time for the normal state of the terminal equipment.

5. A terminal equipment as set forth in claim 4 further comprising a response delay time setting portion for externally inputting the delay time and/or the another delay time into the response delay time table of the terminal equipment.

* * * * *